(12) United States Patent
Faizan et al.

(10) Patent No.: US 12,327,279 B2
(45) Date of Patent: Jun. 10, 2025

(54) SYSTEM FOR DISPLAYING SELECTED CLOTHES ON A DUMMY HUMAN BODY

(71) Applicant: Mirza Faizan, Irving, TX (US)

(72) Inventors: Mirza Faizan, Irving, TX (US); Kimaya Rafiq Meherali, Dallas, TX (US)

( * ) Notice: Subject to any disclaimer, the term of this patent is extended or adjusted under 35 U.S.C. 154(b) by 311 days.

(21) Appl. No.: 17/993,091

(22) Filed: Nov. 23, 2022

(65) Prior Publication Data
US 2024/0144357 A1 May 2, 2024

Related U.S. Application Data

(60) Provisional application No. 63/421,192, filed on Nov. 1, 2022.

(51) Int. Cl.
*G06Q 30/00* (2023.01)
*G06Q 30/0601* (2023.01)
*G06T 19/00* (2011.01)
*G06T 19/20* (2011.01)

(52) U.S. Cl.
CPC ....... *G06Q 30/0643* (2013.01); *G06T 19/006* (2013.01); *G06T 19/20* (2013.01)

(58) Field of Classification Search
CPC .............................................. G06Q 30/06–08
See application file for complete search history.

(56) References Cited

U.S. PATENT DOCUMENTS

| | | | | |
|---|---|---|---|---|
| 2017/0061683 A1* | 3/2017 | Dorin | ...................... | G06V 40/10 |
| 2020/0126316 A1* | 4/2020 | Sharma | ............... | G06F 3/04815 |
| 2020/0320297 A1* | 10/2020 | Ahn | ...................... | G05D 1/0094 |
| 2022/0327783 A1* | 10/2022 | El-Ghoroury | ........... | G06T 19/00 |
| 2023/0206313 A1* | 6/2023 | Yates | ................. | G06Q 30/0631 |
| | | | | 705/27.2 |

OTHER PUBLICATIONS

Jones, Charisse et al., "Chasing Amazon: The Store of the Future is Already Here as Retailers up Their Tech Game", USA Today (online), Dec. 27, 2018 (Year: 2018).*

* cited by examiner

*Primary Examiner* — Ethan D Civan

(57) ABSTRACT

Embodiments of the present disclosure provide a system for provide experience to real time feel of trail of actual clothes to a user is disclosed. The system is utilized in online as well as physical stores. The system utilizes a camera communicatively coupled with a body scanner. The system is further communicatively coupled with a mobile device for providing details of the user. The mobile device may transmit a trigger to a body scanner after receiving an input from the user. The input indicates selection of a cloth from a plurality of clothes available in the store. After receiving the trigger from the mobile device, the body scanner may initiate the camera and determine details of the user. The mobile device may overlap the selected cloth on to a dummy user created using the details of the user.

8 Claims, 7 Drawing Sheets

SYSTEM FOR DISPLAYING SELECTED CLOTHES ON A DUMMY HUMAN BODY

TECHNICAL FIELD

The present disclosure relates generally to mannequin system. More particularly, it relates to displaying samples of clothes on a dummy human body.

BACKGROUND

Customers can buy consumer goods, for example, clothing such as clothing, for example, shirts, pants, jackets and other garments, as well as shoes, glasses and/or any other item or product, such as cosmetics, furniture and the like. Purchases usually take place in commercial facilities, for example, in retail stores. Before making a decision on which item to buy, a customer can try on several items (for example, clothing, cosmetics) and/or pose with other items in the environment (for example, furniture), and can see for each test a user aspect in front of a mirror, which can be located, for example, in a test area of the retail store. For example, the customer can try on a first item, for example, a suit, and see for that first test the appearance of the user in front of the mirror. Next, the customer can try on a second item, for example, another suit. Then, the client may need to memorize the user's appearance of the first test in order to make a mental comparison between the first article and the second article, in order to evaluate which of the two articles might be the most suitable for the client.

Unfortunately, trails of clothes are not available in online stores, such as e-commerce stores. Additionally, also in physical stores since the customer can test numerous items and/or since the second test can take place after a long time after the first test, or even in a different store, the customer may not remember what each test looks like. Therefore, it is necessary to repeatedly test items, for example, clothing items, which have been previously tested. This can result in a frustrating and inefficient shopping experience.

The conventional mirror (that is, a reflective surface) is the common and most reliable tool for an individual to explore their own current appearance, in real time. The prior art has proposed some alternatives around the combination of a camera and a screen to replace the conventional mirror. However, these techniques are not convincing and are not yet accepted as a reliable image of the individual as if he were looking in a conventional mirror. This is mainly due to the fact that the image generated by a camera is very different from an image generated by a mirror.

Due to at least some of the reasons noted above, so far no system has been disclosed which provide real time experience of trial in online as well as physical stores.

Thus, there is a need for a system for providing real time experience and feel of wearing clothes to the user, that addresses the aforesaid problems.

SUMMARY

Consequently, there is a need for an improved method and arrangement for implementing a method and system that alleviates at least some of the above-cited problems.

It is therefore an object of the present disclosure to provide experience to real time feel of trail of actual clothes to mitigate, alleviate, or eliminate all or at least some of the above-discussed drawbacks of presently known solutions.

This and other objects are achieved using a device and a method as defined in the appended claims. The term exemplary is in the present context to be understood as serving as an instance, example or illustration.

According to an aspect of the present disclosure, a system for provide experience to real time feel of trail of actual clothes to a user is disclosed. The system is utilized in online as well as physical stores. The system utilizes a camera communicatively coupled with a body scanner. The system is further communicatively coupled with a mobile device for providing details of the user. The system is communicatively coupled with the mobile phone through one of a wireless network of a wired network. The wireless network includes Bluetooth, WiFi, RF communication, etc.

The mobile device may transmit a trigger to a body scanner after receiving an input from the user. The input indicates selection of a cloth from a plurality of clothes available in the store. After receiving the trigger from the mobile device, the body scanner may initiate the camera and determine details of the user. The details include one or more of height of the user, BMI of the user, circumference of the user, shape of the user, etc. The details of the user may be transmitted to the mobile device.

The mobile device may overlap the selected cloth on to a dummy user created using the details of the user. The user may experience visual experience of wearing the cloth selected for purchasing.

In another aspect, the physical store may include, for example, a mirror-display device capable of operating in one or both of a mirror mode or a display mode. The system may further comprise an imaging device to capture one or more aspects of a field of vision in front of the mirror-display device and an image control unit to select the mode of operation of the mirror-display device according to a user command. The mirror-display device can be in the form of a flat TV, in which during the mirror mode the TV presents a live transposed video signal supplied from the camera, while during the viewing mode it presents a transposed video made in a previous moment and obtained from a memory.

Further, the present invention describes an improved mannequin system that can be used simulate human motion. The mannequin system may be used to test the wear traits and performance of garments. The mannequin may be shaped to represent all or a portion of a human body. If the mannequin system is used to represent feel and looks of a cloth wearing a user.

In some embodiments, any of the above aspects may additionally have features identical with or corresponding to any of the various features as explained above for any of the other aspects.

BRIEF DESCRIPTION OF THE DRAWINGS

The foregoing will be apparent from the following more particular description of the example embodiments, as illustrated in the accompanying drawings in which reference characters refer to the same parts throughout the different views. The drawings are not necessarily to scale, emphasis instead being placed upon illustrating the example embodiments.

DETAILED DESCRIPTION

Figure 1:
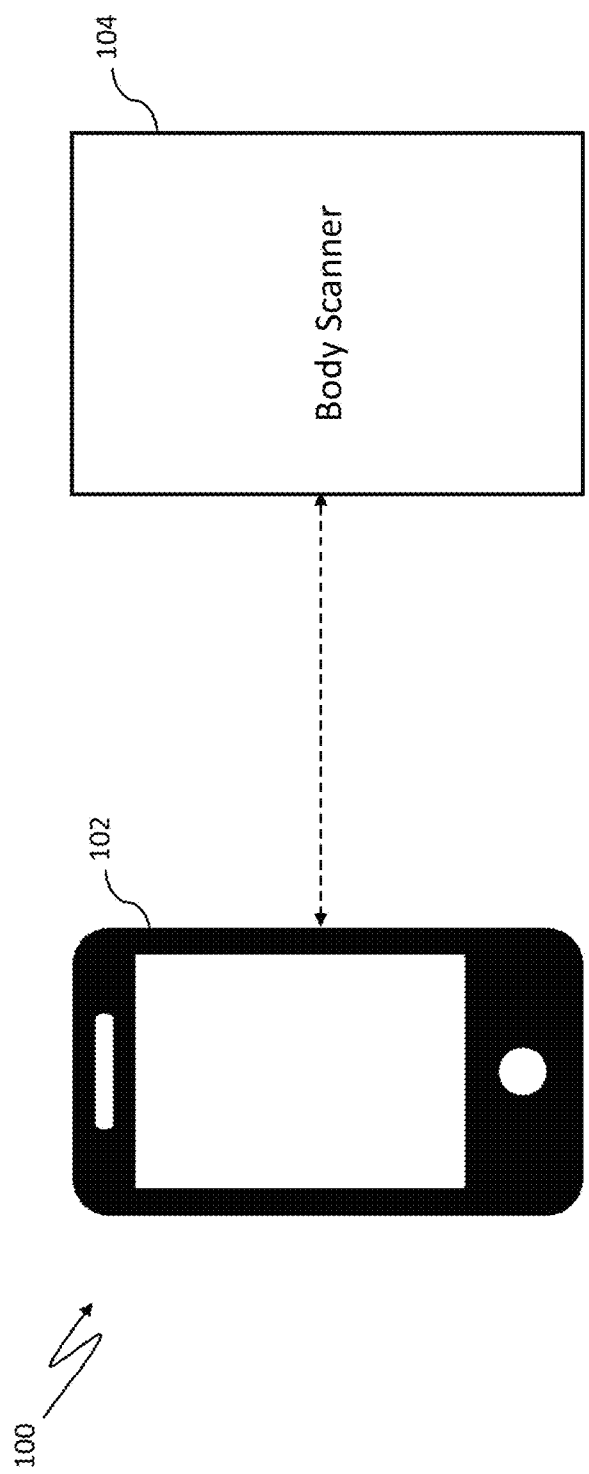
FIG. 1 illustrates a system for providing real time experience and feel of wearing clothes to the user, according to some embodiments of the present invention.

Aspects of the present disclosure will be described more fully hereinafter with reference to the accompanying drawings. The apparatus and methods disclosed herein can, however, be realized in many different forms and should not be construed as being limited to the aspects set forth herein. Like numbers in the drawings refer to like elements throughout.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

The terminology used herein is for the purpose of describing particular aspects of the disclosure only and is not intended to limit the invention. It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an", and "the" are intended to include the plural forms as well, unless the context clearly indicates otherwise.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of the present disclosure will be described and exemplified more fully hereinafter with reference to the accompanying drawings. The solutions disclosed herein can, however, be realized in many different forms and should not be construed as being limited to the embodiments set forth herein.

It will be appreciated that when the present disclosure is described in terms of a method, it may also be embodied in one or more processors and one or more memories coupled to the one or more processors, wherein the one or more memories store one or more programs that perform the steps, services, and functions disclosed herein when executed by the one or more processors.

FIG. 1 illustrates a system 100 for providing real time experience and feel of wearing clothes to a user, according to some embodiments of the present invention. The system 100 may comprise a mobile device 102 and a body scanner 104. The mobile device 102 may be a smart phone, a tablet, a laptop, a desktop, or any computing device with a display screen. The mobile device 102 may provide a user interface (UI) to the user for selecting a cloth from a list of clothes. The UI may be displayed through the display screen coupled with the mobile device 102.

The user may select a desired cloth from the list of clothes through the UI. For example, the display screen may be a touch input screen through with the user may provide the input to the mobile device 102. The mobile device 102 may be communicatively coupled with the body scanner 104. In an implementation, the connection between the mobile device 102 and the body scanner 104 may be a wired connection. In another implementation, the connection between the mobile device 102 and the body scanner 104 may be a wireless connection. The wired connection may be a physical connection using connecting wires. The wireless connection may be one of Bluetooth, WiFi, RF communication, etc.

The mobile device 102 may transmit a trigger to the body scanner 104 after receiving the input from the user. The body scanner 104 may be initialized by receiving the input from the user. The body scanner 104 may determine details associated with the user. The details of the user may be required for superimposing a sample of the selected cloth on a dummy user. The details of the user may include, but not limited to, height of the user, Body Mass Index (BMI) of the user, circumference of the user, and shape of the user.

The body scanner 104 may transmit the details of the user to the mobile device 102. The mobile device 102 may utilize the details of the user for creating the dummy user having shape and size similar to the real user. For creating the dummy user using the details of the user, the mobile device 102 may use a process of mannequin. For example, the mannequin may be shaped to represent all or a portion of a human body. The mannequin system is used to test the wear and performance of absorbent articles.

The mobile device 102 may extract a sample of the selected cloth from the plurality of clothes listed in the store. Further, the mobile device 102 may superimpose the sample of the selected cloth on the created dummy user. The mobile device 102 may display the dummy user with superimposed cloth selected by the user. In an embodiment, the dummy user with the superimposed cloth may be displayed on the display screen of the mobile device 102. In another embodiment, the dummy user with the superimposed cloth may be display on a mirror-display device capable of operating in one or both of a mirror mode or a display mode. The mirror-display device may be explained in detail using FIG. 4.

The user may experience the real feel of the selected cloth on his/her body. Before finalizing the desired cloth from the list of clothes, the user may try several options of the clothes.

Figure 2:
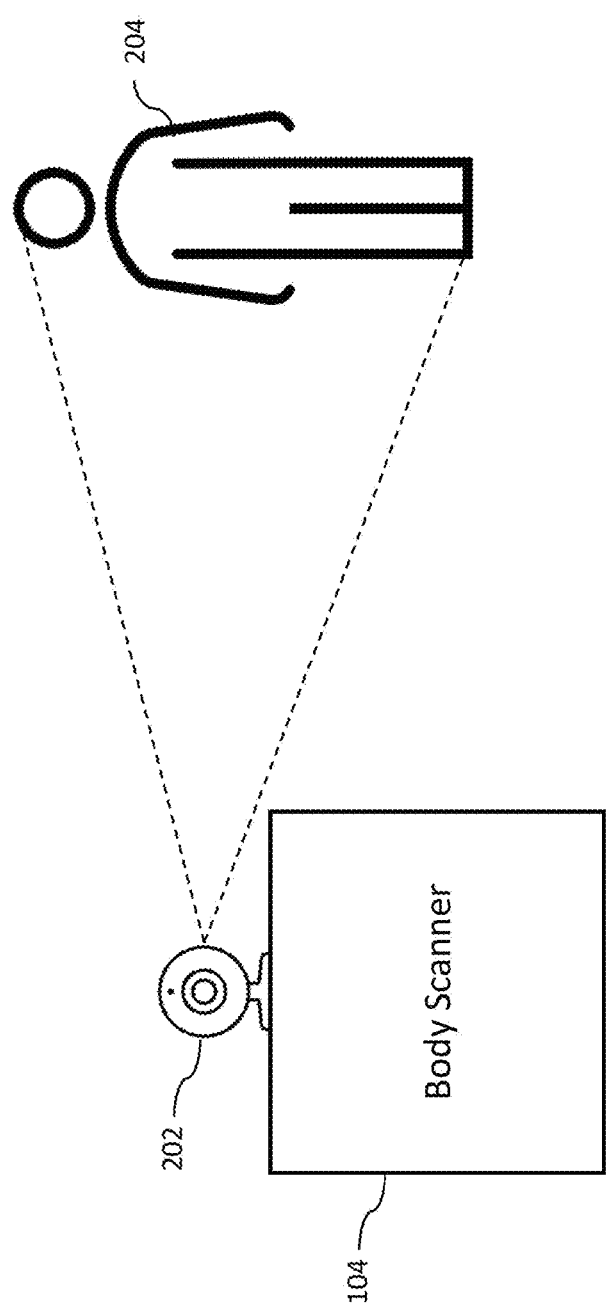
FIG. 2 illustrates working of a body scanner utilized in the system for providing real time experience and feel of wearing clothes to the user, according to some embodiments of the present invention.

FIG. 2 illustrates working of the body scanner 104 utilized in the system 100 for providing real time experience and feel of wearing clothes to the user 204, according to some embodiments of the present invention. The body scanner 104 may be communicatively coupled with an imaging device 202. Examples of the imaging device 202 may include, but not limited to, 360 camera, Virtual Reality (VR)

camera, 3D camcorder, body camera, dash camera, action camera, autofocus camera, etc.

The imaging device 202 may capture image or video of the user 204 standing in front of the imaging device 202. The user 204 may rotate in front of the imaging device 202 with rising his hand. The imaging device 202 may capture the video of the user 204 in different angles. Using the video of the user 204, the imaging device 202 may create 3D image of the user. Further, the imaging device 202 may transmit the image to the body scanner 104.

The body scanner 104 may utilize the 3D image shared by the imaging device 202 for determining details of the user 204. For example, the body scanner 104 may determine one or more of height of the user, BMI of the user, circumference of the user, shape of the user, etc.

Figure 3:
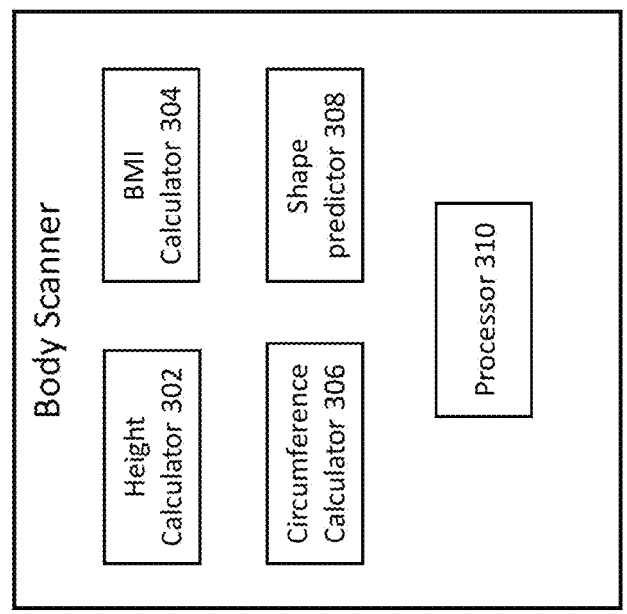
FIG. 3 illustrates a block diagram of the body scanner, according to some embodiments of the present invention.

FIG. 3 illustrates a block diagram of the body scanner 104, according to some embodiments of the present invention. The body scanner 104 may comprise one or more modules for calculating different aspects of the user. For example, the body scanner 104 may comprise a height calculator module 302 for calculating a height of the user 204 using the 3D image of the user 204 captured by the imaging device 202. Further, the body scanner 104 may comprise a BMI calculator module 304 for calculating body mass index of the user 204 using the 3D image of the user 204 captured by the imaging device 202. Furthermore, the body scanner 104 may comprise a circumference calculator module 306 for calculating a circumference of the user 204 using the 3D image of the user 204 captured by the imaging device 202. Additionally, the body scanner 104 may comprise a shape predictor module 308 for predicting shape of the user 204 using the 3D image of the user 204 captured by the imaging device 202. The shape of the user may be predicted using height, BMI, and circumference of the user 204. The body scanner 104 may comprise a processor 310 for controlling the height calculator module 302, the BMI calculator module 304, the circumference calculator module 306, and the shape predictor module 308.

Further, the processor 310 may determine details of the user 204 using the height, BMI, circumference, and shape of the user 204. The body scanner 104 may transmit the details of the user 204 to the mobile device 102 for creating of the dummy user in order to provide visual experience of wearing the selected cloth to the user 204.

Figure 4:
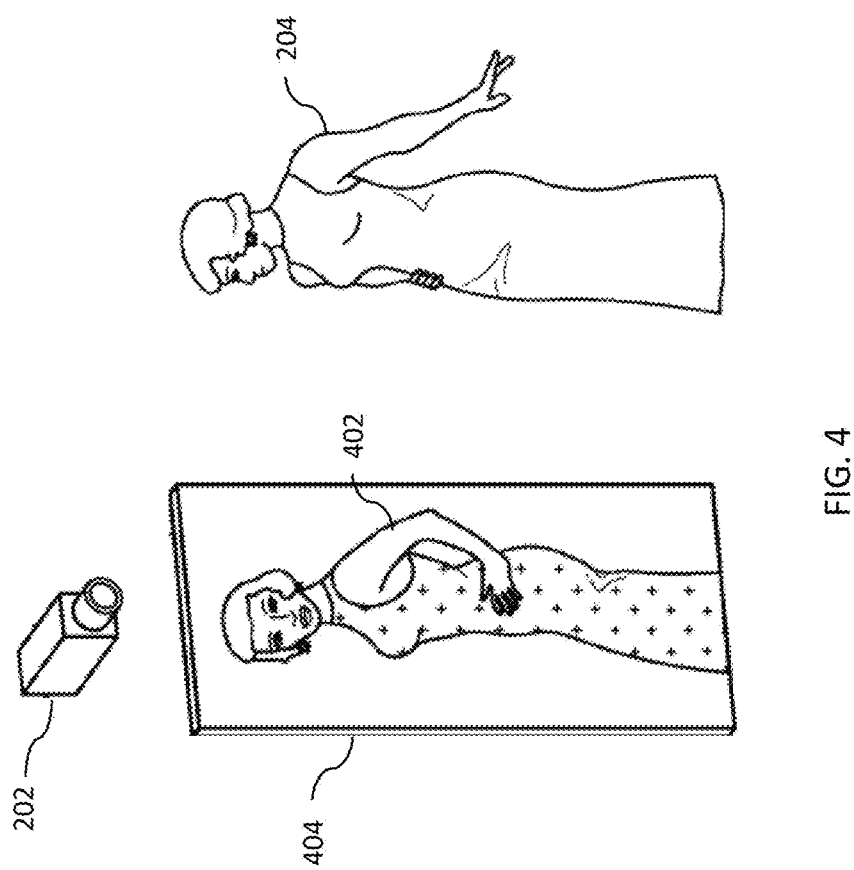
FIG. 4 illustrates an exemplary scenario of usage of the system for providing real time experience and feel of wearing clothes to the user, according to some embodiments of the present invention.

FIG. 4 illustrates an exemplary scenario of usage of the system 100 for providing real time experience and feel of wearing clothes to the user 204, according to some embodiments of the present invention. In an embodiment, the physical store may utilize the similar system for providing visual experience of wearing the selected cloth of the user 204.

Owner of the physical store may keep limited stock in their showroom. Other similar stocks may be kept in their storage unit. For example, different colors of same inventory may be stored in somewhere else. The user 204 may visit the showroom and try one of the clothes. The user 204 may want to try another color of same cloth. The store may comprise a mirror-display device 404 capable of operating in one or both of a mirror mode or a display mode. The system 100 may further comprise the imaging device 202 to capture one or more aspects of a field of vision in front of the mirror-display device 404 and an image control unit to select the mode of operation of the mirror-display device 404 according to a user command. The mirror-display device 404 can be in the form of a flat TV, in which during the mirror mode the TV presents a live transposed video signal supplied from the camera, while during the viewing mode it presents a transposed video made in a previous moment and obtained from a memory.

Figure 5:
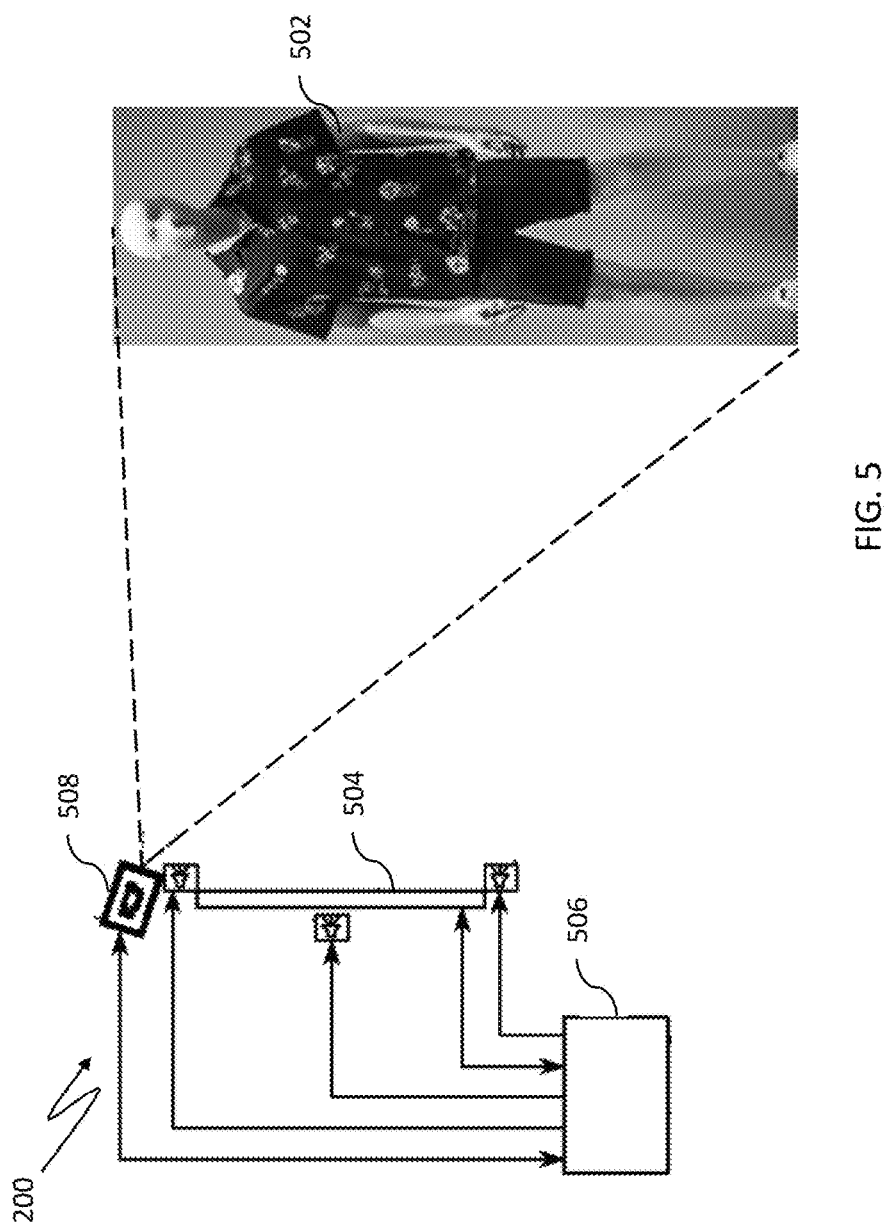
FIG. 5 illustrates an improved mannequin system, according to some embodiments of the present invention.

FIG. 5 illustrates an improved mannequin system 200, according to some embodiments of the present invention. The mannequin system 200 may be used to simulate human motion. The mannequin system 200 may be used to test the wear traits and performance of garments. The mannequin may be shaped to represent all or a portion of a human body if the mannequin system 200 is used to represent feel and looks of a cloth wearing a user. The mannequin system 200 may comprise a physical dummy 502 on which several light sources 504 are placed, for example, LED arrangements, in different locations around the dummy 502. The LED arrangement 504 may be controlled by a controller 506. The light sources 504 may be operated in order to create more depth in the image, for example, by adding shadows and highly illuminated areas. The light sources 504 may be of different colors, in order to improve the existing lighting and create the appropriate global "temperature" of the displayed image. The light sources 504 may also be adjusted according to the distance to the user 204, in order to create a uniform image and eliminate the artifacts created by the lighting of the store. Alternatively, or additionally, changes in color and lighting can be made directly by the controller 506 in the digital image received from the imaging device 202. For example, the color transformation can be used to improve the mirror aspect of the image, for example, to operate on parameters providing an image that is: bright, defined, crisp, matte, metallic, etc. The controller 506 can also add virtual light points and/or shadows in the image to create more depth in the image using a projector 508. In addition, an antireflective coating is provided in front of the screen in order to eliminate and reduce the reflections that are normally associated with flat screens. The LED arrangement 504 can be connected to a light sensor and/or a light temperature sensor, and can be pre-set to remain at specific levels of light and light temperatures, and will be automatically adjusted.

Figure 6:
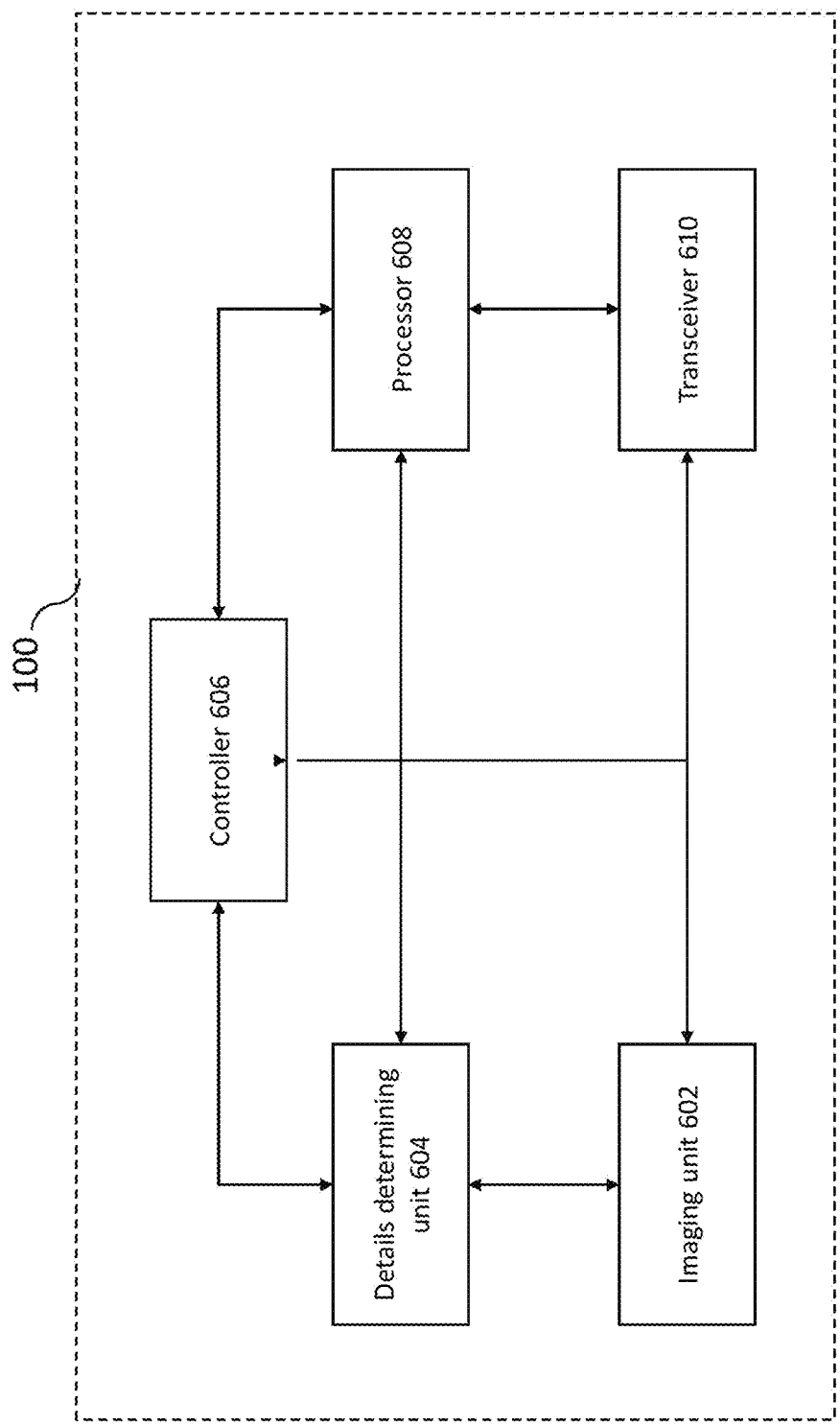
FIG. 6 illustrates a schematic block diagram illustrating an example apparatus, according to some embodiments of the present invention.

FIG. 6 illustrates a schematic block diagram illustrating an example apparatus, according to some embodiments of the present invention. The device 100 may be capable of providing real time experience and feel of wearing clothes to the user 204.

According to at least some embodiments of the present invention, the apparatus 100 in FIG. 6 comprises one or more modules. These modules may e.g., be an imaging unit 602, a details determining unit 604, a controller 606, a processor 608, and a transceiver 610. The controller 606, may in some embodiments be adapted to control the above-mentioned modules.

The imaging unit 602, the details determining unit 604, the processor 608, and the transceiver 610 as well as the controller 606, may be operatively connected to each other.

Optionally, the transceiver 610 may be adapted to receive an instruction for usage of the system 100.

The controller 606 may be adapted to control the steps as executed by the system 100 according to the instructions received by the transceiver 610. For example, the controller 606 may be adapted to activate the details determining unit 604 (as described above in conjunction with the FIG. 1).

Further, the processor 608 is adapted to perform the method and FIG. 1 in conjunction with the controller 606.

The imaging unit 602 may be adapted to capture image or video of the user.

Figure 7:
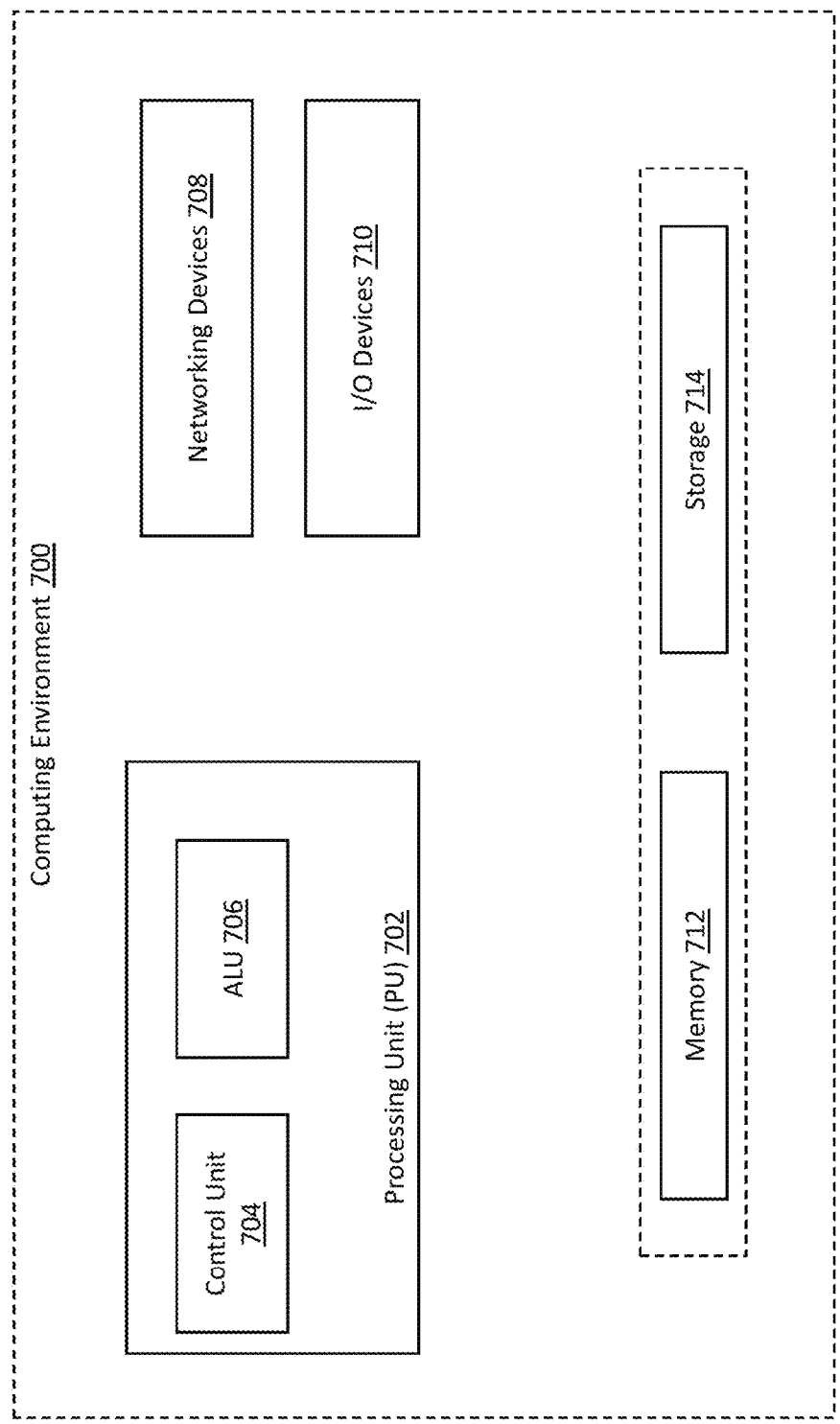
FIG. 7 illustrates an example computing environment implementing a device providing real time experience and feel of wearing clothes to the user, according to some embodiment of the present invention.

FIG. 7 illustrates an example computing environment implementing a device providing real time experience and feel of wearing clothes to the user, according to some embodiment of the present invention. As depicted in FIG. 7, the computing environment 700 comprises at least one processing unit 702 that is equipped with a control unit 704 and an Arithmetic Logic Unit (ALU) 706, a plurality of networking devices 708 and a plurality Input output, I/O devices 710, a memory 712, and a storage 714. The processing unit 702 may be responsible for implementing the method described in FIGS. 1-5. For example, the processing unit 702 may in some embodiments be equivalent to the processor of the mobile device and the UE described above in conjunction with the FIGS. 1-5. The processing unit 702 is capable of executing software instructions stored in memory 712. The processing unit 702 receives commands from the control unit 704 in order to perform its processing. Further, any logical and arithmetic operations involved in the execution of the instructions are computed with the help of the ALU 706.

The computer program is loadable into the processing unit 702, which may, for example, be comprised in an electronic apparatus. When loaded into the processing unit 702, the computer program may be stored in the memory 712 associated with or comprised in the processing unit 702. According to some embodiments, the computer program may, when loaded into and run by the processing unit 702, cause execution of method steps according to, for example, any of the methods illustrated in FIGS. 1-5 or otherwise described herein.

The overall computing environment 700 may be composed of multiple homogeneous and/or heterogeneous cores, multiple CPUs of different kinds, special media and other accelerators. Further, the plurality of processing unit 702 may be located on a single chip or over multiple chips.

The algorithm comprising of instructions and codes required for the implementation are stored in either the memory 712 or the storage 714 or both. At the time of execution, the instructions may be fetched from the corresponding memory 712 and/or storage 714, and executed by the processing unit 702.

In case of any hardware implementations various networking devices 708 or external I/O devices 710 may be connected to the computing environment to support the implementation through the networking devices 708 and the I/O devices 710.

The embodiments disclosed herein can be implemented through at least one software program running on at least one hardware device and performing network management functions to control the elements. The elements shown in FIG. 7 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the disclosure.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the disclosure.

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user's computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer-readable media such as RAMs, ROMs, flash memory, EEPROMs, optical devices (CD or DVD), hard drives, and floppy drives, or any suitable device. The computer-executable component can be a processor but any suitable dedicated hardware device can (alternatively or additionally) execute the instructions.

As a person skilled in the art will recognize from the previous detailed description and the figures and claims, modifications and changes can be made to the embodiments of the invention without departing from the spirit and scope of this invention.

The invention claimed is:

1. A system for providing real time experience and feel of wearing garments to a user, the system comprising:
   a display device;
   a camera configured to capture an image or a video of the user in front of the display device;
   a body scanner configured to determine details of the user based on the captured image or video of the user; and
   a processor configured to:
   receive a choice of a garment from a plurality of garments available in a store;
   create a dummy user using the details of the user, wherein the dummy user has a shape and a size similar to the user;
   create one or more dummy garments based on the details of the user and the choice of the garment selected by the user;
   superimpose each dummy garment of the one or more dummy garments on the dummy user to render a superimposed image;
   receive an input from the user to select a mode of operation of the display device; and
   control the display device to operate in one of a mirror mode or a display mode, wherein in the mirror mode, the display device is configured to display a live transposed video captured by the camera in real-time, wherein the live transposed video includes an image of the user superimposed with the garment selected by the user, and in the display mode, the display device is configured to display the superimposed image to the user for selection of an appropriate garment for the user.

2. The system as claimed in claim 1, wherein the choice of the garment is received using one of a Quick Response (QR) code, a bar code, and a unique identification number associated with each garment.

3. The system as claimed in claim 1, wherein the details of the user comprise one or more of height of the user, Body Mass Index (BMI) of the user, circumference of the user, shape of the user.

4. The system as claimed in claim 1, wherein each of the one or more dummy garments is associated with a variation of a selected garment available in other stores or in warehouse related to the store, and wherein the variation of the selected garment comprises one or more of a different color available for the selected garment, a different print pattern available for the selected garment, and a different material available for the selected garment.

5. The system as claimed in claim 4, wherein each of the one or more dummy garments is rendered on the dummy user in sequence for enabling the user to select an appropriate variation of the selected garment.

6. The system as claimed in claim 1, wherein the dummy user is a mannequin system equipped with several light sources placed on outer surface of the dummy user.

7. The system as claimed in claim 6, wherein the light sources are an arrangement of a plurality of Light Emitting Diode (LED) lights.

8. The system as claimed in claim 7, wherein the plurality of LED lights have different colors for rendering virtual garment on the dummy use.

* * * * *